(12) United States Patent
Shariat

(10) Patent No.: US 12,047,246 B2
(45) Date of Patent: Jul. 23, 2024

(54) DATA ANALYTICS IN A TELECOMMUNICATION NETWORK

(71) Applicant: Samsung Electronics Co., Ltd., Suwon-si (KR)

(72) Inventor: Mehrdad Shariat, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 17/608,885

(22) PCT Filed: May 7, 2020

(86) PCT No.: PCT/KR2020/006015
§ 371 (c)(1),
(2) Date: Nov. 4, 2021

(87) PCT Pub. No.: WO2020/231078
PCT Pub. Date: Nov. 19, 2020

(65) Prior Publication Data
US 2022/0303187 A1 Sep. 22, 2022

(30) Foreign Application Priority Data
May 10, 2019 (GB) ..................................... 1906647

(51) Int. Cl.
*H04L 41/14* (2022.01)
*H04L 41/40* (2022.01)
(Continued)

(52) U.S. Cl.
CPC .............. *H04L 41/14* (2013.01); *H04L 41/40* (2022.05); *H04L 43/06* (2013.01); *H04L 69/28* (2013.01)

(58) Field of Classification Search
None
See application file for complete search history.

(56) References Cited

U.S. PATENT DOCUMENTS 11,379,860 B2 * 7/2022 Pathare .............. G06Q 30/0201
11,552,856 B2   1/2023 Chong et al.
(Continued)

FOREIGN PATENT DOCUMENTS

| CN | 109600243 A | 4/2019 |
| EP | 3 013 002 A1 | 4/2016 |
| WO | 2016/049065 A2 | 3/2016 |

OTHER PUBLICATIONS

Samsung et al., KI#2, New Sol: Time coordination for Multiple NWDAFs, SA WG2 Meeting #139E, S2-2003781, Jun. 1-12, 2020, Elbonia.
(Continued)

*Primary Examiner* — Otis L Thompson, Jr.
(74) *Attorney, Agent, or Firm* — Jefferson IP Law, LLP

(57) ABSTRACT

The disclosure relates to a pre-5th-generation (5G) or 5G communication system to be provided for supporting higher data rates beyond 4th-generation (4G) communication system such as long term evolution (LTE). Disclosed is a method of providing processed analytics data from a plurality of analytics data suppliers to an analytics data consumer, wherein the analytics data consumer takes action on the basis of the processed analytics data only when the processed analytics data from all of the plurality of analytics data suppliers has been received or until a defined period has elapsed.

14 Claims, 4 Drawing Sheets

(51) Int. Cl.
*H04L 43/06* (2022.01)
*H04L 69/28* (2022.01)

(56) References Cited

U.S. PATENT DOCUMENTS

| | | | | |
|---|---|---|---|---|
| 11,831,400 | B2* | 11/2023 | Brown | H04J 14/0227 |
| 11,831,458 | B2* | 11/2023 | Liao | H04W 12/06 |
| 2017/0078157 | A1 | 3/2017 | Zhang | |
| 2018/0262924 | A1 | 9/2018 | Dao et al. | |
| 2019/0281103 | A1* | 9/2019 | Singh | H04L 41/5025 |
| 2020/0228420 | A1* | 7/2020 | Dao | H04L 43/08 |
| 2021/0075631 | A1* | 3/2021 | Liao | H04W 4/24 |
| 2022/0070071 | A1* | 3/2022 | Poe | H04L 41/14 |
| 2022/0191650 | A1* | 6/2022 | Kim | H04L 67/10 |
| 2023/0292172 | A1* | 9/2023 | Puente Pestaña | H04W 4/24 370/235 |
| 2023/0379707 | A1* | 11/2023 | Tiwari | H04W 8/02 |
| 2023/0379856 | A1* | 11/2023 | Ryu | H04W 60/04 |

OTHER PUBLICATIONS

Samsung et al., KI#2, New Sol: Time coordination for Multiple NWDAFs, SA WG2 Meeting #139E, S2-2004530, Jun. 1-12, 2020, Elbonia.
Samsung et al., KI#2, Sol #13: Update to Time coordination for Multiple NWDAFs, SA WG2 Meeting #140E, S2-2005173, Aug. 19-Sep. 2, 2020, Elbonia.
Samsung et al., KI#2, Sol #13: Update to Time coordination for Multiple NWDAFs, SA WG2 Meeting #140E 62-2006236, Aug. 19-Sep. 2, 2020, Elbonia.
Samsung et al., Update to time coordination across multiple NWDAF instances, 3GPP TSG-WG SA2 Meeting #144E e-meeting, S2-2103252, Apr. 12-16, 2021, Elbonia.
Samsung et al., Update to Contents of Analytics Exposure, 3GPP TSG-WG SA2 Meeting #145E e-meeting, S2-2104552, May 17-28, 2021, Elbonia.
Samsung et al., Procedure for time coordination across multiple NWDAF instances, 3GPP TSG-WG SA2 Meeting #143E e-meeting, S2-2101326, Feb. 24-Mar. 9, 2021, Elbonia.
Qualcomm Incorporated, eNA Interworking, 3GPP TSG-RAN3 #103bis, R3-191308, Mar. 30, 2019, Xi'an, China.
3rd Generation Partnership Project; Technical Specification Group Core Network and Terminals; 5G System; Network Data Analytics Services; Stage 3 (Release 15), 3GPP TS 29.520 V15.3.0, Mar. 28, 2019, pp. 8-17.
3rd Generation Partnership Project; Technical Specification Group Services and System Aspects; Study of Enablers for Network Automation for 5G (Release 16), 3GPP TR 23.791 V16.1.0, Mar. 2019, Valbonne—France See p. 100—Note 4, Paragraph 1, p. 56, for example.
3rd Generation Partnership Project; Technical Specification Group Services and System Aspects; Architecture enhancements for 5G System (5GS) to support network data analytics services (Release 16), 3GPP TS 23.288 V0.4.0, Apr. 2019, Valbonne—France See section 4.1.
UK Search Report dated Nov. 9, 2019, issued in UK Application No. GB1906647.1.
Ericsson, OAM and AF as consumer of analytics, S2-1905355, SA WG2 Meeting #133, May 7, 2019, Reno, Nevada, USA.
LG Electronics et al., New solution for KI#15, S2-1901807, SA WG2 Meeting #131, Feb. 19, 2019, Santa Cruz, Tenerife, Spain.
Huawei et al., Miscellaneous corrections for TR 23.700-91, S2-2008016, 3GPP TSG SA2 Meeting #141E e-meeting, Oct. 23, 2020, Elbonia.
European Search Report dated May 9, 2022, issued in European Application No. 20806723.1.
Chinese Office Action dated Oct. 28, 2023, issued in Chinese Patent Application No. 202080034771.6.
Chinese Office Action dated Apr. 3, 2024, issued in Chinese Patent Application No. 202080034771.6.

* cited by examiner

[Fig. 1]
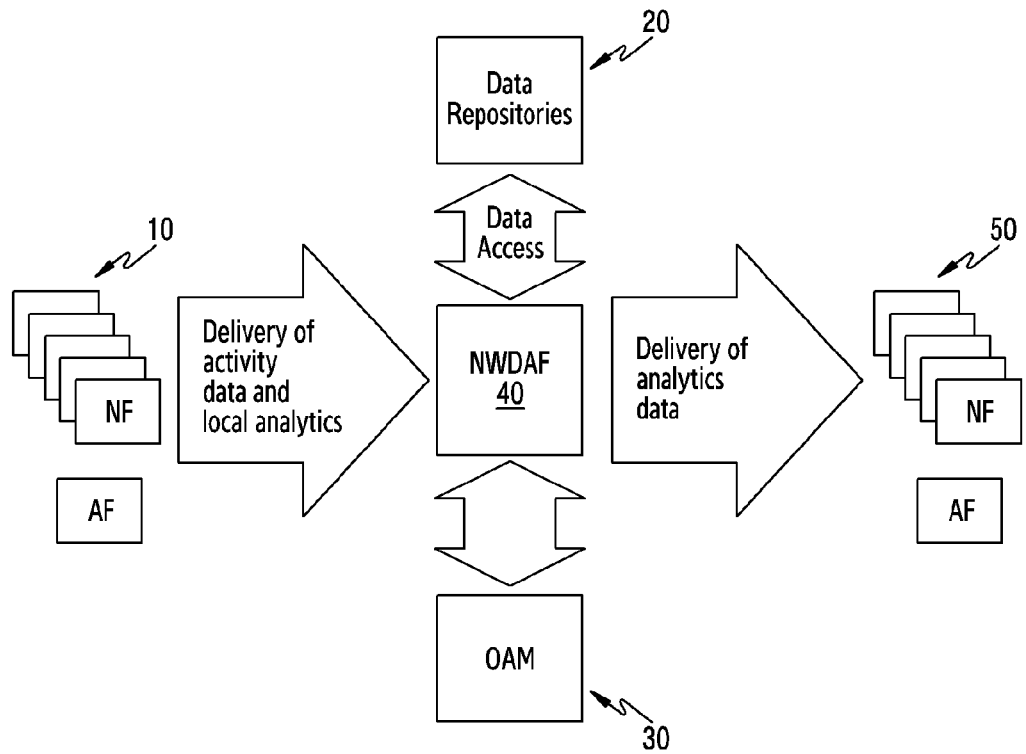
[Fig. 2]
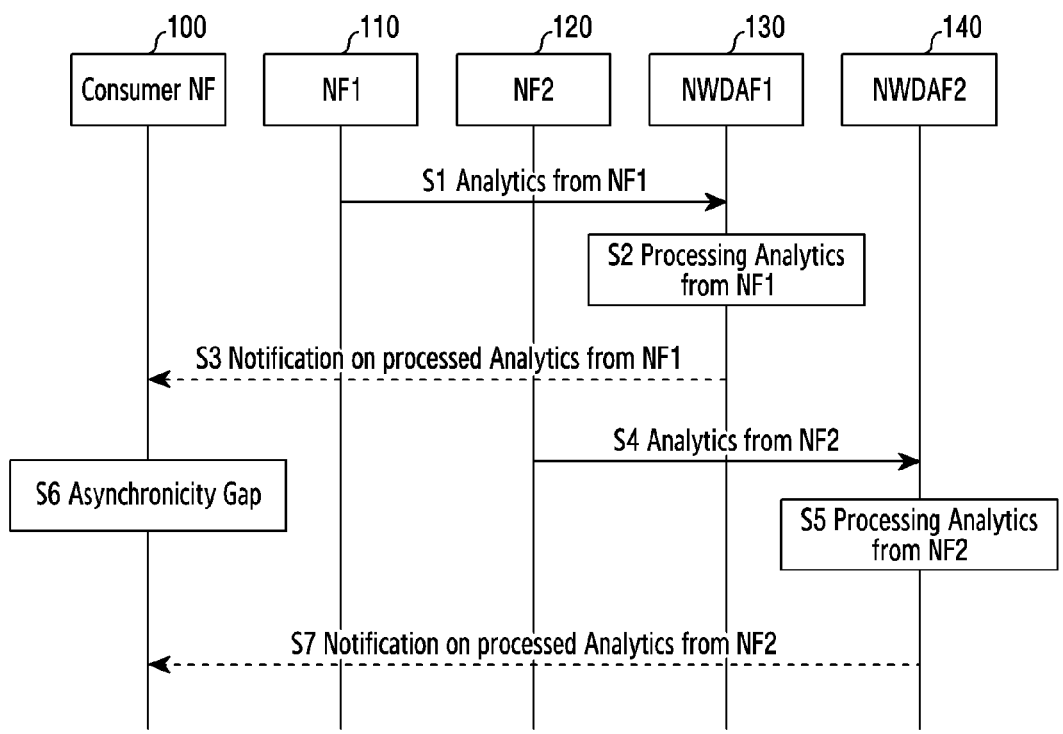

[Fig. 3]
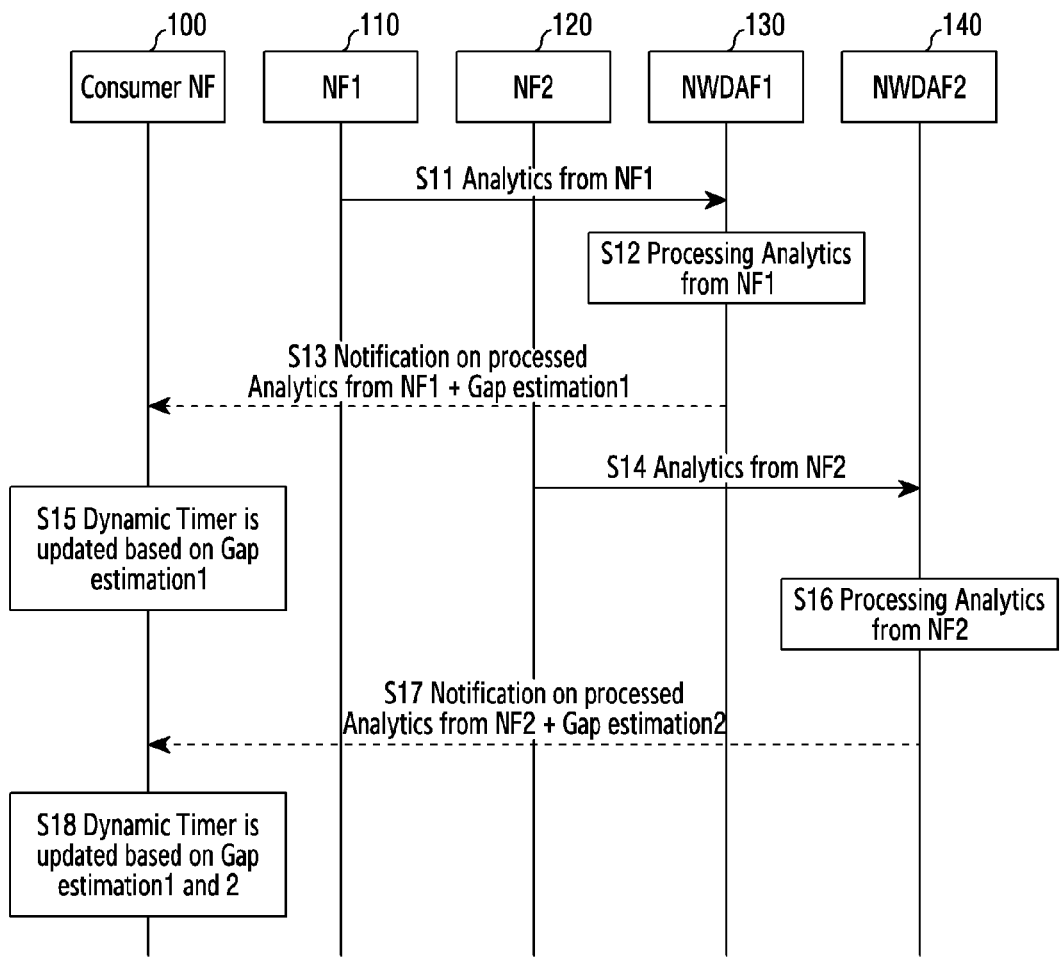

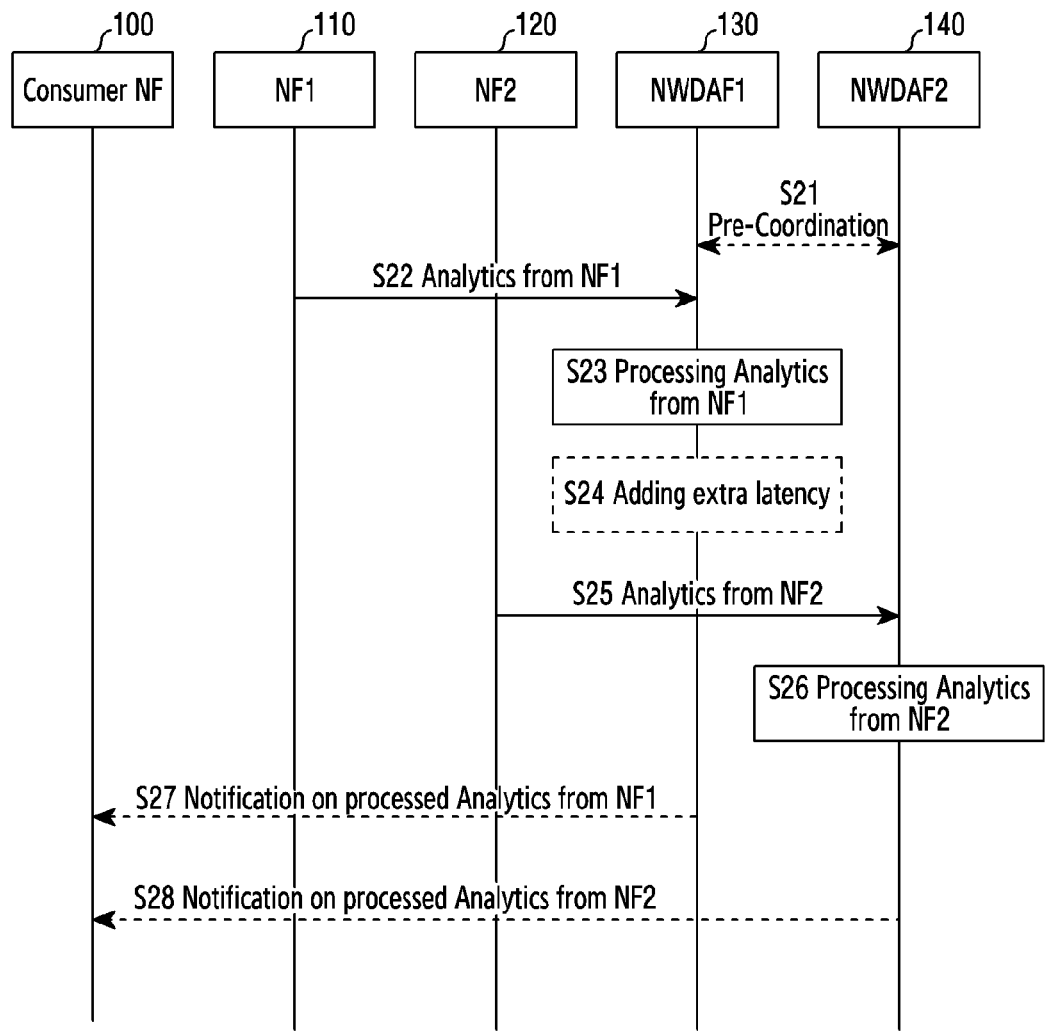
[Fig. 4]

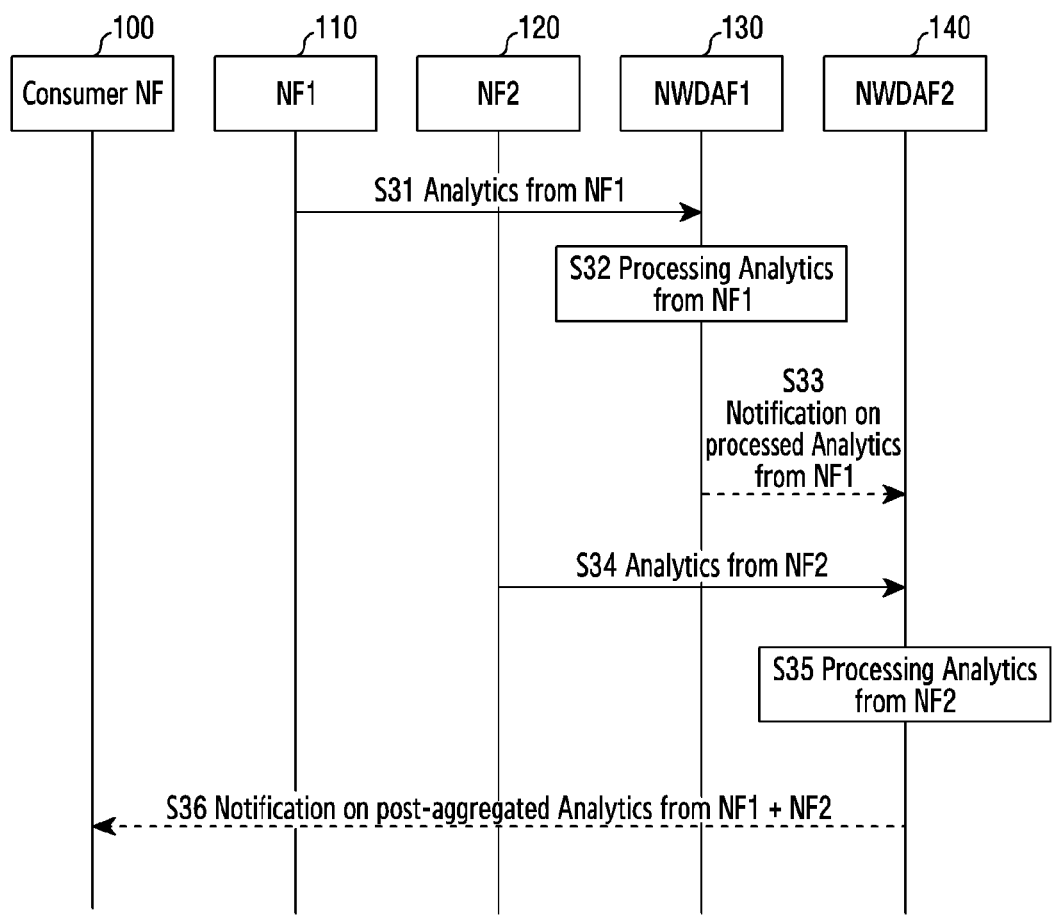
[Fig. 5]

DATA ANALYTICS IN A TELECOMMUNICATION NETWORK

TECHNICAL FIELD

The present invention relates to network automation, particularly in a fifth generation (5G) telecommunication network, although other telecommunication networks could benefit from features of the invention.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G Network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

There is an increasing desire to improve network automation for 5G telecommunication networks, known as enabling network automation (eNA). As a part of this, network data analytics function (NWDAF) are defined as part of a service based architecture (SBA) using mechanisms and interfaces specified for 5G core and operations administration and maintenance (OAM).

DISCLOSURE OF INVENTION

Technical Problem

Embodiments of the present invention seek to address issue with the prior art, whether mentioned herein or not.

Solution to Problem

According to the present invention there is provided an apparatus and method as set forth in the appended claims. Other features of the invention will be apparent from the dependent claims, and the description which follows.

According to a first aspect of the present invention, there is provided a method of providing processed analytics data from a plurality of analytics data suppliers to an analytics data consumer, wherein the analytics data consumer takes action on the basis of the processed analytics data only when the processed analytics data from all of the plurality of analytics data suppliers has been received or until a defined period has elapsed.

In an embodiment, upon receipt at the analytics data consumer of processed analytics data from a first of the plurality of analytics data suppliers and a first time value, a timer is started, and the analytics data consumer takes action on the basis of the processed analytics data from a first of the plurality of analytics data suppliers when the timer equals the received first time value.

In an embodiment, upon receipt at the analytics data consumer of processed analytics data from a second of the plurality of analytics data suppliers and a second time value, the timer is updated on the basis of the first and second time values, and the analytics data consumer takes action on the basis of the processed analytics data from the first and second of the plurality of analytics data suppliers when the timer equals the sum of the first and second received time values.

In an embodiment, one of the processed analytics data from one of the plurality of analytics data suppliers is relatively delayed compared to processed analytics data from others of the plurality of analytics data suppliers, such that processed analytics data from each of the plurality of analytics data suppliers is received at the analytics data consumer substantially simultaneously or within a defined time period.

In an embodiment, the relative delay is achieved by: delaying processed analytics data from one or more analytics data suppliers; accelerating processed analytics data from one or more analytics data suppliers; relocating one or more entities in the network; or applying a load balancing procedure.

In an embodiment, a degree of relative delay is determined on the basis of coordination between the plurality of analytics data suppliers.

In an embodiment, a network entity is designated as an aggregation point and receives processed analytics from a plurality of analytics data suppliers and transmits this in aggregated form to the data analytics consumer.

In an embodiment, if the aggregation point is itself an analytics data supplier, then one of the plurality of analytics data suppliers from which it receives data for aggregation includes itself.

In an embodiment, the aggregation point is selected to be the slowest amongst any given plurality of analytics data suppliers.

In an embodiment, the method is performed in a telecommunication network.

In an embodiment, the analytics data supplier is a Network Data Analytics Function, NWDAF.

In an embodiment, the analytics data consumer is a Network Function, NF.

In an embodiment, an estimated asynchronicity gap is defined as a difference of total latency of consuming analytics via two instances of analytics data supplier by an analytics data consumer, and the estimated asynchronicity gap is periodically updated and stored as a new parameter within a host system.

According to a second aspect of the present invention, there is provided apparatus arranged to perform the method of the first aspect.

Advantageous Effects of Invention

It should be noted that various embodiments of the present invention may be combined in a hybrid manner. For instance, one embodiment, e.g. the first embodiment may be a default embodiment and if after a defined period of time, a gap time is exceeded, then the second or third embodiment may be utilised. The time period in this case can be determined based on a maximum time that a consumer NF can wait before adopting a network management or control policy.

BRIEF DESCRIPTION OF DRAWINGS

Although a few preferred embodiments of the present invention have been shown and described, it will be appreciated by those skilled in the art that various changes and modifications might be made without departing from the scope of the invention, as defined in the appended claims.

For a better understanding of the invention, and to show how embodiments of the same may be carried into effect, reference will now be made, by way of example only, to the accompanying diagrammatic drawings in which:

FIG. 1 shows a general representation of a 5G network automation framework;

FIG. 2 shows a general network setup illustrating certain features of embodiments of the invention;

FIG. 3 shows a message exchange and method according to a first embodiment of the present invention;

FIG. 4 shows a message exchange and method according to a second embodiment of the present invention; and FIG. 5 shows a message exchange and method according to a third embodiment of the present invention.

BEST MODE FOR CARRYING OUT THE INVENTION

FIG. 1 shows a general schematic overview illustrating various element in a 5G network automation scheme. This shows that activity data and analytics are provided from a first group of NFs or application functions (AFs) 10 to NWDAF 40. NWDAF also interfaces to OAM 30 and data repositories 20. NWDAF 40 analyses the data from these sources and delivers analytics data to a second group of NFs or AFs 50. The second group of NFs 50 may include some or all of the first group of NFs or AFs 10.

In a service-based architecture, each network function (NF) comprises a set of services that interfaces it (as the producer of such services) to other NFs (as the consumer of those services) over a common bus known as service-based interface (SBI).

A single instance or multiple instances of NWDAF may be deployed in a public land mobile network (PLMN). In case multiple NWDAF instances are deployed, the architecture supports deploying the NWDAF as a central NF, as a collection of distributed NFs, or as a combination of both.

When multiple NWDAFs exist, not all of them need to be able to provide the same type of analytics results. In other words, some of them can be specialized so to provide certain types of analytics only. An Analytics ID information element is used to identify the type of supported analytics that a particular NWDAF can generate. The capabilities of a NWDAF instance are described in the NWDAF profile stored in the network repository function (NRF).

In cases where multiple instances of NWDAF are deployed, with some specializing in providing certain type of analytics, unintended interactions may develop for a given network function (NF) if it consumes data analytics coming from different specialized NWDAF instances in an asynchronous manner. It is therefore desirable to provided means for conflict resolution, preferably with corresponding procedures and/or parameters to tackle this issue.

As an example use case, consider multiple instances of NWDAF collecting specialized network data analytics from distinct NFs ($NF_i$). Each corresponding specialized instance of NWDAF is referred to as $NWDAF_i$ (i=1, 2, ..., m, n, ... K).

The total latency involved in consuming analytics includes the time elapsed from raw data acquisition to delivery of analytics. This is represented as total latency of consuming analytics from $NF_i$ and comprises the below elements:

$$T_{i,Total} = T_{i,NWDAF} + T_{i,Processing} + T_{i,Notification}$$

Where $T_{i,NWDAF}$: Data sharing latency of $NF_i$ raw analytics to $NWDAF_i$, $T_{i,Processing}$: Processing latency of $NF_i$ analytics in $NWDAF_i$, $T_{i,Notification}$: Notification latency of processed $NF_i$ analytics from $NWDAF_i$ to consumer NF, $T_{i,Total}$: Total latency of consuming analytics from $NF_i$ via $NWDAF_i$ by the consumer NF.

Any two arbitrary NWDAF instances $NWDAF_m$ and $NWDAF_n$ (m≠n) are considered asynchronous assuming the difference between $T_{m,Total}$ and $T_{n,Total}$ is non-zero. In other words, it is not generally possible to know whether analytics from any two NWDAF instances will arrive at a consuming NF simultaneously or within any given timeframe. As such, any two or NWDAF instances are typically regarded as asynchronous instances.

Herein, Asynchronicity Gap of two NWDAF instances m and n ($\Delta_{m,n}$) is defined as the difference of Total latency of consuming analytics via the two instances by a consumer NF.

It is clear that Asynchronous instances have non-zero Asynchronicity Gap.

$$\Delta_{m,n} = T_{m,Total} - T_{n,Total}$$

$\Delta_{m,n}$: Asynchronicity Gap of instances m and n.

FIG. 2 illustrates the general scenario where there is a consuming NF 100, NF1 110, NF2 120, NWDAF1 130 and NWDAF2 140 forming at least part of a system. This also shows the various processes and messaging between respective elements.

NF1 110 provides analytics to NWDAF1 130 at step S1 and NWDAF1 130 processes them in step S2. At S3, NWDAF1 130 notifies the consumer NF 100 that it has processed the analytics from NF1 110.

At S4, NF2 120 provides analytics to NWDAAF2 140, which processes them at S5.

At S6, the Asynchronicity gap represents the non-zero time that elapses between step S3 and S7, which follow.

At S7, NWDAF2 140 notifies the consumer NF 100 that it has processed the analytics from NF2 120.

Assuming two instances of NWDAF, NWDAFm 130 and NWDAFn 140 (m=1 and n=2 in this example) are asynchronous (with respect to a consumer NF 100), i.e. ($\Delta_{m,n}$>0), if the consumer NF 100 adopts a network management or control policy (e.g. on radio access, admission control, mobility or session management) based on analytics via NWDAF m 130, the policy may be sub-optimal until the Asynchronicity Gap has passed (S6) and a full data set has arrived incorporating also analytics via NWDAFn 140. In effect, a network policy adopted based on analytics via NWDAFm 130 only may even conflict with an optimal policy to be adopted based on analytics incorporating both NWDAFm 130 and NWDAFn 140.

An example, NWDAFm 130 is specialized in UE mobility analytics corresponding to the access and mobility management function (AMF) and NWDAFn 140 is specialized in UE communication analytics corresponding to the session management function (SMF). If the policy control function (PCF) as consumer NF 100 in the network receives a notification from instance NWDAFm 130 only (AMF associated), alerting to unexpected UE location, it may adopt a network control policy to extend service area restrictions. However, upcoming complementary data from instance NWDAFn 140 (SMF associated) could reveal that the UE has in fact been hijacked and the correct network control policy by PCF should have been to ask SMF to release the user session, contradicting the earlier decision based on instance NWDAFm 130 only mobility analytics.

This example is only one of many possible scenarios where reliance on only one report (or a subset of possible reports) results in an undesirable outcome.

As a result, embodiments of the present invention aim to minimize the Asynchronicity Gap between different NWDAF instances. However, this may be difficult in many practical settings (e.g. when NWDAF instances are deployed on remote processing nodes in a cloud-native environment). As such, embodiments of the invention further provide a conflict resolution procedure/entity which seeks to ensure improved timing/synchronization of notifications.

According to a first embodiment of the present invention, there is provided a timer-based solution. This is illustrated in FIG. 3. In this embodiment, the network entities 100-140 are as described previously, but are configured to carry out steps S11-S18, as follow.

In this embodiment, a dynamic timer is adopted by the consumer NF 100. The consumer NF 100 uses the dynamic timer to define the minimum waiting time before adopting a network policy. The dynamic timer can be updated based on an "estimated" gap time of analytics coming from different NWDAF instances where each instance will update its individual estimation (on the gap), based on past history from the same instance. This information can be conveyed to the consumer NF 100 along with a notification on processed analytics or via separate services/signaling messages.

In more detail, and referring to FIG. 3, NF1 110 provides analytics to NWDAF1 130 at step S11. At step S12, NWDAF1 130 processes the analytics from NF1 110 and provides the same, along with a gap estimation, to consumer NF 100 in message S13.

NF2 120 provides analytics to NWDAF2 140 at step S14. At step S16, NWDAF2 140 processes the analytics from NF2 120 and provides the same, along with a gap estimation, to consumer NF 100 in message S17.

At step S15, the dynamic timer is updated based on the gap estimation provided in step S13 from NWDAF1 130. Consumer NF 100 waits based on the dynamic timer value (the gap estimation in step S13) before adopting any actions or changes in network management or control policy.

At step S18, the dynamic timer is updated based on the additional gap estimation received in step S17 from NWDAF2 140. Consumer NF 100 waits based on the dynamic timer value (incorporating the gap estimation in both steps S13 and S17) before adopting any actions or changes in network management or control policy.

In a second embodiment, as illustrated in FIG. 4, multiple instances of NWDAF 130, 140 pre-coordinate with each other, either in distributed fashion or via a central entity (e.g. Network Repository Function, NRF) to ensure that the notifications on processed analytics arrive together in a (pseudo-)synchronous manner. This may be achieved by, for instance, adding extra latency to faster instances, by accelerating the processing of slower instances or by relocating instances to the processing nodes that are in proximity of each other.

The Estimated Asynchronicity Gap of any two NWDAF instances (NWDAF1 130 and NWDAF2 140) for a given consumer NF 100 can be periodically updated and stored as a new parameter (or set of parameters) within NWDAF profile in NRF. On service discovery step via NRF (to identify corresponding NWDAF analytics IDs to subscribe to), the consumer NF 100 can assess the Estimated Asynchronicity Gap and if it is beyond a maximum value it can wait, and a pre-coordination action can be triggered (on subscription) via Consumer NF 100 notifying all instances (NWDAF1 130 and NWDAF2 140).

Similar procedure can also be triggered after subscription based on actual Asynchronicity Gap at Consumer NF 100. As described above, this can be achieved via a combination of adding extra latency to faster instances (NWDAF1 130), accelerating the processing of slower instances (NWDAF2 140) or relocation of the instances closer together or any other load balancing algorithms that can be adopted based on network deployment architecture.

NF1 110 provides analytics to NWDAF1 130 at step S22. At step S23, NWDAF1 130 processes the analytics from NF1 110. Depending on the results of the pre-coordination S21, extra latency may be added at step S24 to effectively slow the notification of the processed analytics from NWDAF1 S130 (as the faster instance here) or to adopt any other network deployment options as described above.

NF2 120 provides analytics to NWDAF2 140 at step S25. At step S26, NWDAF2 140 processes the analytics from NF2 120.

At steps S27 and S28, respectively, which occur simultaneously, or near simultaneously, or at least within a defined time window, the processed analytics from NWDAF1 130 and NWDAF2 140 are sent to Consumer NF 100.

The pre-co-ordination step S21 ensures that the extra latency added at S24, if required, substantially aligns, in time, the transmission of the results of the processing steps S23 and S26.

As mentioned above, rather than slow down one (or more) of the steps above, it is possible that one (or more) of the steps is accelerated, perhaps by assigning more resources to it or by prioritizing a message transfer mechanism associated with that step.

By means of this embodiment, the required information in the form of processed analytics is made to arrive at the consumer NF 100 in a time window which allows the consumer NF 100 to more usefully utilize the results by being in possession of the requisite information from as many instances of NWDAF as needed.

In a third embodiment, as illustrated in FIG. 5, a central entity is provided which acts as an aggregation point to gather analytics from multiple instances before conveying them to the consumer NF 100. The central entity may be a new dedicated entity or may be a prior art network entity, which is additionally tasked to act as the aggregation point.

In more detail, NF1 110 provides analytics to NWDAF1 130 at step S31. At step S32, NWDAF1 130 processes the analytics. At step S33, NWDAF1 130 sends the processed analytics to NWDAF1 140, which is acting as the aggregation point in this embodiment.

At step S34, NF2 120 provides analytics to NWDAF2 140. At step S35, NWDAF2 140 processes the analytics. At step S36, NWDAF2 140 sends post-aggregated processed analytics, including the results of processing steps S32 and S35 to consumer NF 100.

By means of this embodiment, by aggregating all the processed analytics at a single point, it is possible to transmit all the required analytics simultaneously or nearly simultaneously, such that the consumer NF 100 is able to properly consider all the desired information in a timely manner. In this example, NWDAF2 140 is designated as aggregation point, but it could equally have been NWDAF1 130 or, indeed, some other network entity, as required. However, by selecting the slowest NWDAF instance, in this example, NWDAF2 140, it is possible to make use of this relative slowness to allow other NWDAF instances to supply the selected aggregation point with their data, which also minimise additional signalling between different NWDAF instances.

In a further embodiment, a hybrid solution utilizing features of more than one of the first, second and third embodiment is provided. For example, the first embodiment, illustrated in FIG. 3 may be adopted as a default. However, if the "estimated" gap time goes beyond a predefined threshold, the second embodiment (pre-co-ordination) or the third embodiment (post-aggregation) can be adopted. The predefined threshold can be set based on a maximum time that the consumer NF 100 can wait (without violating service level agreements) before adopting a network management or control policy. In essence, in the hybrid solution, if the dynamic timer of the first embodiment exceeds a threshold, then one or more of the alternative embodiments is employed.

Embodiments of the present invention provide a means by which processed data analytics may be provided to a consumer NF in a controlled manner whereby the inherent asynchronous nature of such data, and the problems inherent in that, is addressed by controlling the timing of the delivery of said data from a plurality of NWDAFs within a system.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of performed by an analytics data consumer in a wireless communication system, the method comprising:
   receiving, from a first network data analytics function (NWDAF) of a plurality of NWDAFs, a first message associated with first analytics data, the first message including information on a first time period;
   updating a dynamic timer based on the first time period, wherein the dynamic timer indicates a minimum waiting time for analytics coming from the plurality of NWDAFs;
   receiving, from a second NWDAF of the plurality of NWDAFs, a second message associated with second analytics data, the second message including information on a second time period; and
   updating the dynamic timer based on the second time period,
   wherein the analytic data consumer waits to receive further analytics data until a time equals to a value of the updated dynamic timer.

2. The method of claim 1, wherein one of the plurality of NWDAFs is designated as an aggregation point and configured to receive processed analytics from another NWDAF of the plurality of NWDAFs.

3. The method of claim 1, wherein the analytics data consumer is a network function (NF).

4. The method of claim 1,
   wherein the first analytics data is generated in the first NWDAF based on a processing of first data of a first network function,
   wherein the second analytics data is generated in the first NWDAF based on a processing of second data of a second network function, and
   wherein the first message indicates a notification associated with the first analytics data and the second message indicates a notification associated with the second analytics data.

5. The method of claim 1,
wherein the dynamic timer is associated with an analytics identification (ID), and
wherein the analytics ID is used to identify a type of supported analytics that a NWDAF generates.

6. An apparatus of an analytics data consumer in a wireless communication system, the apparatus comprising:
at least one transceiver; and
at least one processor coupled to the at least one transceiver, configured to:
receive, from a first network data analytics function (NWDAF) of a plurality of NWDAFs, a first message associated with first analytics data, the first message including information on a first time period,
update a dynamic timer based on the first time period, wherein the dynamic timer indicates a minimum waiting time for analytics coming from the plurality of NWDAFs,
receive, from a second NWDAF of the plurality of NWDAFs, a second message associated with second analytics data, the second message including information on a second time period, and
update the dynamic timer based on the second time period,
wherein the analytic data consumer waits to receive further analytics data until a time equals to a value of the updated dynamic timer.

7. The apparatus of claim 6,
wherein the first analytics data is generated in the first NWDAF based on a processing of first data of a first network function,
wherein the second analytics data is generated in the first NWDAF based on a processing of second data of a second network function, and
wherein the first message indicates a notification associated with the first analytics data and the second message indicates a notification associated with the second analytics data.

8. The apparatus of claim 6,
wherein the dynamic timer is associated with an analytics identification (ID), and
wherein the analytics ID is used to identify a type of supported analytics that a NWDAF generates.

9. The apparatus of claim 6, wherein one of the plurality of NWDAFs is designated as an aggregation point and configured to receive processed analytics from another NWDAF of the plurality of NWDAFs.

10. The apparatus of claim 6, wherein the analytics data consumer is a network function (NF).

11. A method of performed by a network data analytics function (NWDAF) of a plurality of NWDAFs, in a wireless communication system, the method comprising:
receiving, from a first network function, data;
generating, first analytics data based on the received data;
transmitting, to an analytics data consumer, a first message associated with the first analytics data, the first message including information on a first time period,
wherein the first time period is used by the analytics data consumer to update a dynamic timer,
wherein the dynamic timer indicates a minimum waiting time for receiving analytics data from the plurality of NWDAFs by the analytics data consumer, and
wherein the analytic data consumer waits to receive further analytics data until a time equals to a value of the updated dynamic timer.

12. The method of claim 11,
wherein the first analytics data is generated in a first NWDAF based on a processing of first data of the first network function, and
wherein the first message indicates a notification associated with the first analytics data.

13. An apparatus of a network data analytics function (NWDAF) of a plurality of NWDAFs, in a wireless communication system, the apparatus comprising:
at least one transceiver; and
at least one processor coupled to the at least one transceiver, configured to:
receive, from a first network function, data,
generate, first analytics data based on the received data; and
transmit, to an analytics data consumer, a first message associated with the first analytics data, the first message including information on a first time period,
wherein the first time period is used by the analytics data consumer to update a dynamic timer,
wherein the dynamic timer indicates a minimum waiting time for receiving analytics data from the plurality of NWDAFs by the analytics data consumer, and
wherein the analytic data consumer waits to receive further analytics data until a time equals to a value of the updated dynamic timer.

14. The apparatus of claim 13,
wherein the first analytics data is generated in a first NWDAF based on a processing of first data of the first network function, and
wherein the first message indicates a notification associated with the first analytics data.

* * * * *